Sept. 19, 1933.     A. L. LEMAN     1,927,460
PISTON
Filed Sept. 19, 1932
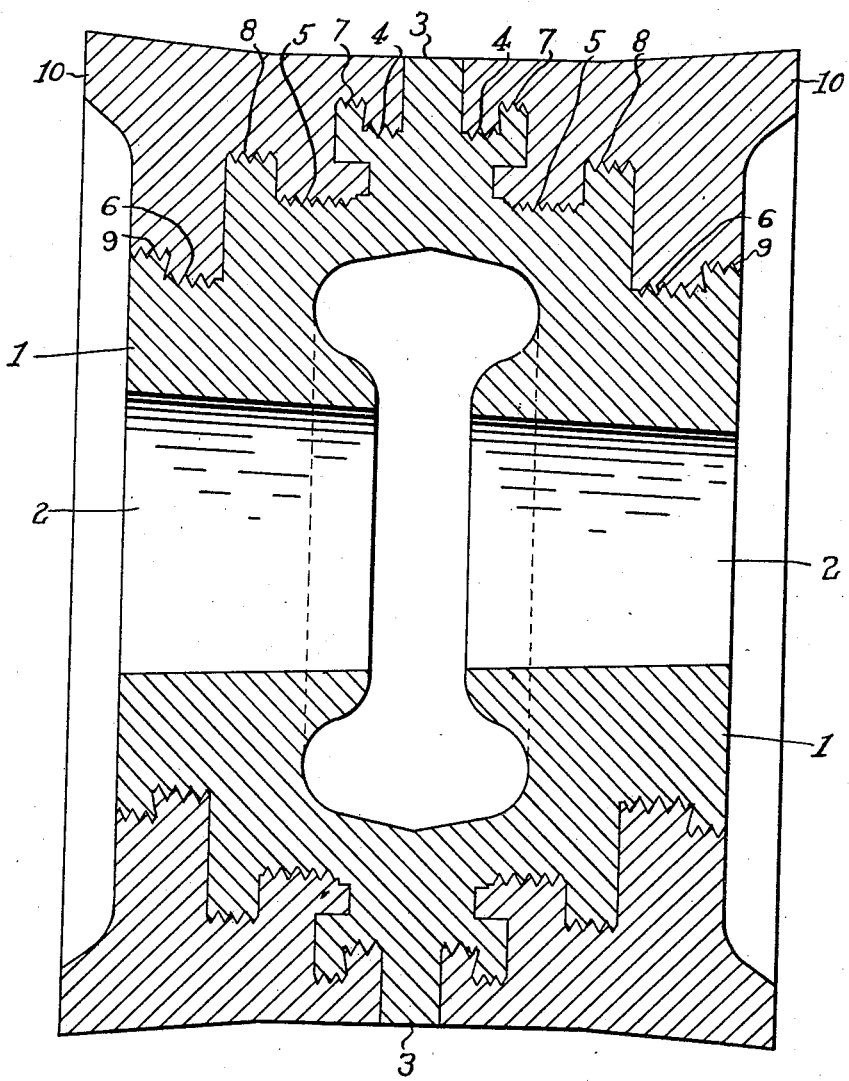
INVENTOR
A. L. Leman
by F. N. Barber
attorney Patented Sept. 19, 1933

1,927,460

UNITED STATES PATENT OFFICE 1,927,460

PISTON

Arthur L. Leman, Toledo, Ohio, assignor to The National Supply Company, Toledo, Ohio, a corporation of Ohio Application September 19, 1932
Serial No. 633,725

2 Claims. (Cl. 309—4)

This invention relates to pistons having rubber, molded on metallic cores. The core has midway between its ends a radial flange adapted to contact with the internal surface of the cylinder in which it works. The core at each side of the radial flange tapers longitudinally or toward the ends of the core. The tapered surfaces are provided with recesses and radial flanges to receive and anchor the molded rubber to the core. The thickness of the rubber on the core increases in steps from the central flange to the ends of the core. One purpose of this is to prevent excessive expansion of the rubber at the central portions of the piston. Excessive expansion there produces excessive friction on the central portion of the piston, which has been the cause of many failures at the intermediate portions of pistons with molded rubber thereon.

The accompanying drawing shows a central longitudinal section through a piston built in accordance with this invention.

Another purpose of this invention is to effectively anchor the rubber to the flange so as to prevent its pulling away therefrom on the back strokes.

1 designates a metallic core having the tapered longitudinal bore 2 to receive one end of a piston rod. Midway between the ends of the core is the radial flange 3. The peripheral surface of the core at each side of the flange 3 has a number of peripheral steps or circular surfaces 4, 5, and 6 parallel with the axial center of the core or piston. Each step or surface has at its outer end a radial circular rib, the ribs being marked 7, 8, and 9. The peripheries of the steps 4, 5, and 6 and of the ribs are provided with peripheral teeth as shown.

An annulus 10 of rubber is molded on the core at each side of the flange 3 against the sides of the flange 3, and upon the steps or surfaces 4, 5, and 6, and all the exposed surfaces of the ribs 7, 8, and 9 except at the outer surfaces of the ribs 9. The steps 5 extend inwardly somewhat beneath the ribs 7 to provide annular grooves for receiving rubber and holding the annuli 10 from outward radial movement.

The steps 4 are next to the central flange 3 and are only a short distance from the periphery of the piston. The steps 5 are still farther from the flange 3 or nearer the ends of the piston. They are also farther from the periphery of the piston than the steps 4. The steps 6 are still farther from the flange 3 and still farther from the periphery of this piston; they are comparatively close to the ends of the core and to the central opening 2. Thus, the steps 4, 5, and 6 are arranged so as to form in general surfaces tapering from the flange 3 or the central portion of the periphery of the core to the ends of the core, the steps carrying the radial ribs 7, 8 and 9. By means of the conical ends of the core, great resiliency of the rubber is obtained at the ends of the piston. As the rubber is thinner at each step toward the flange 3 or the longitudinal center of the piston, the resiliency is decreased toward the center of the piston length. This results in less friction of the rubber on the cylinder at the central portion of the piston, whereby the life of the piston is increased. Where the rubber is thick at the longitudinal center of the piston, failures are common there. The periphery of the flange 3 is not covered with rubber, but may engage the cylinder wall.

I claim:—

1. In a reciprocating pump piston, a metallic core having midway between its ends a radially extending annular flange terminating substantially at the peripheral surface of the piston, the peripheral surface of the core at each side of the flange having a smaller diameter than the flange and extending axially to a plane between said flange and the end of the core and from said plane receding inwardly toward the axial center of the core, the annular space between the flange and the said peripheral surface being relatively restricted, in combination with separate resilient packing elements molded peripherally on each end of the core.

2. In a reciprocating pump piston, a metallic core having midway between its ends a radially extending annular flange terminating substantially at the peripheral surface of the piston, the peripheral surface of the core at each side of the flange having a smaller diameter than the flange and extending axially to a transverse plane between said flange and the end of the core, and from said plane receding inwardly toward the axial center by a succession of steps toward the end of the core in substantially frusto-conical form, in combination with separate resilient packer elements molded peripherally on each end of the core.

ARTHUR L. LEMAN.